UNITED STATES PATENT OFFICE.

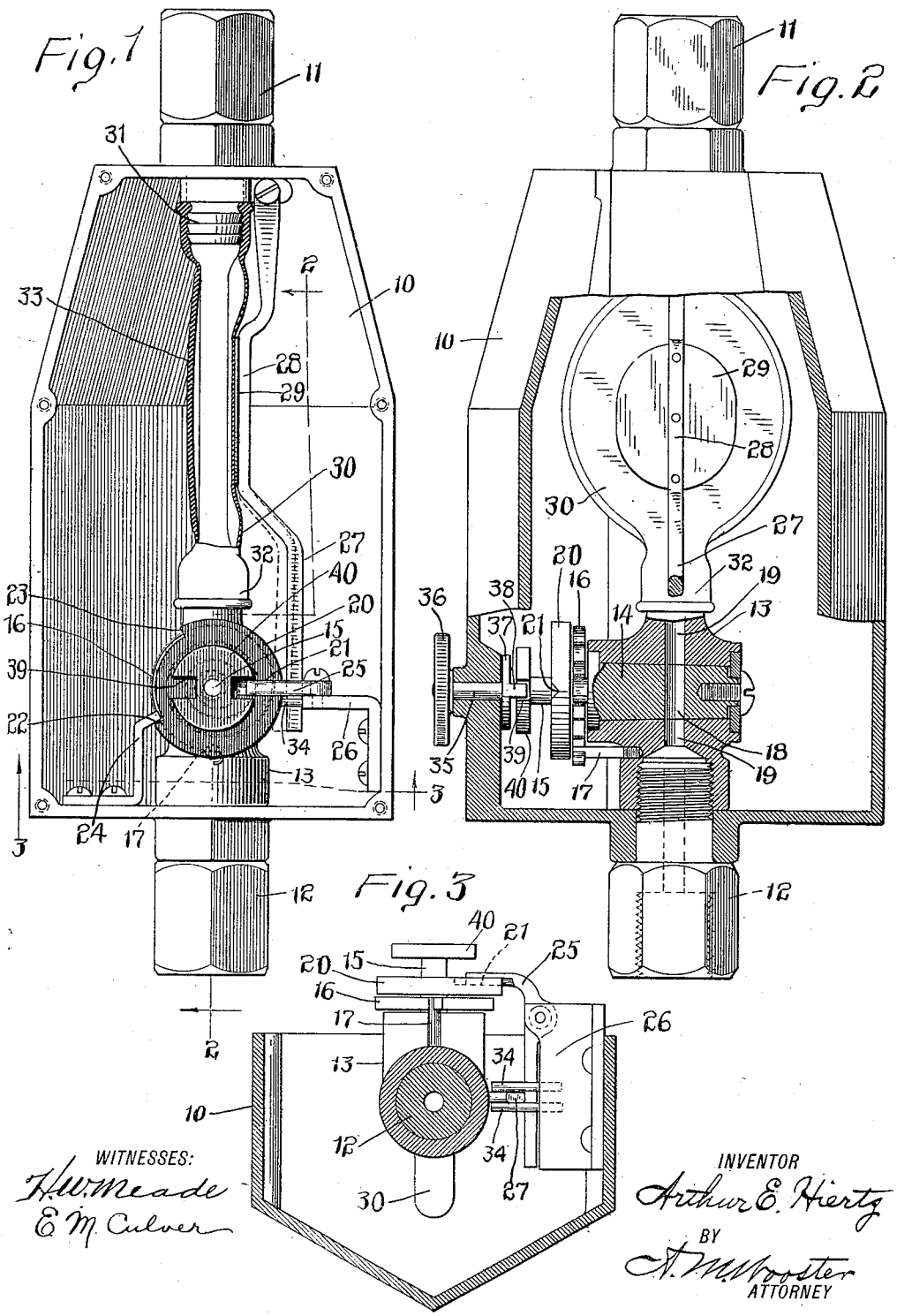

ARTHUR E. HIERTZ, OF BRIDGEPORT, CONNECTICUT.

AUTOMATIC VALVE FOR GAS-FIXTURES.

1,104,116.  Specification of Letters Patent.  Patented July 21, 1914.

Application filed January 31, 1914. Serial No. 815,691.

*To all whom it may concern:*

Be it known that I, ARTHUR E. HIERTZ, a citizen of the United States, residing at Bridgeport, county of Fairfield, State of Connecticut, have invented an Improvement in Automatic Valves for Gas-Fixtures, of which the following is a specification.

This invention has for its object to provide an automatic or self-closing valve, especially adapted for use in connection with coin-controlled meters, which will act to shut off the gas when the pressure falls below a predetermined minimum and retain it shut off until the valve is opened manually. It is of course well understood that the serious loss of life resulting from the use of coin-controlled meters has been caused by the gas not having been shut off at jets and chandeliers after the meter had automatically shut off the supply, so that when gas was again supplied to the service pipes it was permitted to escape freely into the room. This serious condition is wholly prevented by my novel valve, as where chandeliers and jets are provided with my novel valves the escape of gas is rendered impossible even if the jets are left open and the gas is turned on after having been shut off by the meter, and gas can only pass to the chandelier or jet after the valve has been manually opened.

With the above and other objects in view I have devised the novel automatic gas valve which I will now describe referring to the accompanying drawing forming a part of this specification and using reference characters to indicate the several parts.

Figure 1 is a face view of my novel valve in the open position, a portion of the case being removed; Fig. 2 a section on the line 2—2 in Fig. 1, looking in the direction of the arrows, and Fig. 3 is a section on the line 3—3 in Fig. 1, looking in the direction of the arrows.

10 denotes a case which may be of any convenient construction and configuration, 11 a connection to a supply pipe, 12 a connection to a service pipe, 13 the body of the valve, 14 the plug and 15 the shank. These parts may be of any ordinary or preferred construction.

In the drawing I have illustrated the ordinary simple form of straightway valve or cock.

16 denotes a coil spring, the inner end of which is attached to the shank and the outer end to a pin 17 extending from the body, the action of which is to close the valve, that is, to rotate the plug and carry the passage 18 through the plug out of alinement with the alined passages 19 in the body.

20 denotes a disk carried by the shank which is provided in its face with a groove 21, preferably made V-shape, and in its periphery with stop shoulders 22 and 23, either of which is adapted to engage a stop 24 secured to the case. The engagement of shoulder 22 with the stop acts to limit the rotation of the disk, shank and plug in the opening movement and stop said parts with the valve in the fully opened position, as in the drawing, and the engagement of shoulder 23 with the stop limits the rotation of the disk, shank and plug when said parts are rotated by the spring to shut off the flow of gas. The groove in the disk is engaged by one arm (preferably made V-shape to correspond with the groove) of an angle lever 25 which is pivoted to a bracket 26 secured to the case. The valve is retained in the open position while the gas supply is on by means of a long lever 27 which engages the angle lever and retains one arm thereof in engagement with the groove in the face of the disk, as in Fig. 1. Lever 27 is shown as pivoted at the upper end of the case and is provided with an inward offset 28 which carries a plate 29 lying in close engagement with a flattened gas bag 30. One end of the gas bag is connected as at 31 to connection 11 leading to the supply pipe and the other end of said bag is connected as at 32 to the body of the valve. The side of the gas bag which is engaged by plate 29 is left thin and flexible but the opposite side of said bag is stiffened as at 33 so as to render that side of the valve relatively nonflexible.

34 denotes pins extending from a bracket and lying on opposite sides of lever 27 which serve as guides or supports therefor.

As a means for opening the valve manually after it has been automatically closed, and gas is again supplied, the shank may be extended through the case. In the present instance I have shown a short shaft 35 journaled in the case and provided at its outer end with a hand wheel 36 and at its inner end with a disk 37 having lugs 38 which engage recesses 39 in a disk 40 carried by the shank.

The operation is as follows: Suppose the valve to be closed, the disk 20 will be turned from the position shown in Fig. 1, stop shoulder 23 will be contiguous to the stop and the V-shaped arm of the angle lever will be out of engagement with the groove in the face of the disk, in which position the parts are retained by the power of the spring. Should the shank be manually rotated to place the parts in the position shown in the drawing, the spring will instantly return them to the former position as soon as the operator releases the hand wheel. Should the gas be turned on, however, the bag will be distended and will force lever 27 outward to the full line position in Fig. 1. Should the hand wheel now be manipulated, and the parts turned to the position shown in the drawing, the pressure of the gas in the bag on lever 27 will cause said lever to swing the angle lever and place the V-shaped arm of the angle lever in engagement with the groove in the face of disk 20 and so long as the gas pressure remains on, the parts will be locked in this position and the shank cannot be manipulated by means of the hand wheel. Should the gas supply be shut off, however, the bag will collapse, the pressure upon lever 27 will be relieved and the power of the spring acting upon the shank and disk 20 will disengage the disk from the angle lever and rotate the shank and plug to the closing position, in which position they will remain until a fresh supply of gas is turned on to distend the gas bag, and the shank and plug are manually operated to open the valve.

Having thus described my invention I claim:—

1. In an apparatus of the character described, the combination with a rotary valve, of a shaft connected with the valve to turn the same, a disk mounted upon the shaft to turn therewith and provided upon one face with a groove, a coil spring surrounding the shaft, disposed upon one side of the disk and secured to the shaft to turn the same to bring the valve to its closed position, manually operated means to turn the shaft to bring the valve to its open position, a pivoted lever arranged near the disk and having a portion adapted to enter the face groove of the disk, a gas conduit having a flexible portion, and a pivoted lever having a portion thereof engaging the flexible portion of the gas conduit and its lower end arranged to engage the free end of the first-named lever.

2. In apparatus of the character described, the combination with a rotary valve, of a shaft connected with the valve to turn the same, a spring to turn the shaft to bring the valve to the closed position, a disk mounted upon the shaft to turn therewith and provided upon its outer face with a groove V-shaped in cross section, a pivoted bell-crank lever arranged near the disk and having one arm provided with a portion V-shaped in cross-section to enter the V-shaped face groove of the disk, a gas conduit having a flexible portion, and a lever pivoted at one end with a portion engaging the flexible portion of the gas conduit and its free end engaging the free end of the bell-crank lever.

3. In apparatus of the character described, the combination with a horizontal rotary valve, of a shaft to turn the valve, a spring connected with the shaft to turn it to bring the valve to the closed position, a disk mounted upon the shaft to turn therewith and provided upon its face with a radial groove and upon its periphery with spaced stop-shoulders, an upstanding stop disposed near the disk to engage the shoulders to positively limit the movement of the disk in both directions, manually operated means to turn the shaft, a pivoted lever arranged near the disk and adapted to have a portion thereof moved into the face groove of the disk, an upstanding gas conduit having a flexible portion, and an upstanding lever pivoted at its upper end, with a portion thereof engaging the flexible portion of the gas-conduit, and its lower end engaging the bell-crank lever.

In testimony whereof I affix my signature in presence of two witnesses.

ARTHUR E. HIERTZ.

Witnesses:
H. W. MEADE,
ROBERT G. BOOTH.